(12) United States Patent
Warner

(10) Patent No.: US 8,116,409 B1
(45) Date of Patent: Feb. 14, 2012

(54) METHOD AND APPARATUS FOR SERDES JITTER TOLERANCE IMPROVEMENT

(75) Inventor: William D. Warner, Maple Ridge, CA (US)

(73) Assignee: PMC-Sierra, Inc., Santa Clara, CA (US)

( * ) Notice: Subject to any disclaimer, the term of this patent is extended or adjusted under 35 U.S.C. 154(b) by 554 days.

(21) Appl. No.: 12/361,436

(22) Filed: Jan. 28, 2009

(51) Int. Cl.
   *H04L 27/06* (2006.01)
(52) U.S. Cl. .................... 375/340; 375/355; 375/371
(58) Field of Classification Search .................. 375/316, 375/340, 355, 371
See application file for complete search history.

(56) References Cited

U.S. PATENT DOCUMENTS

| | | | |
|---|---|---|---|
| 4,736,391 A | 4/1988 | Siegel | |
| 5,452,333 A | 9/1995 | Guo et al. | |
| 5,761,254 A | 6/1998 | Behrin | |
| 6,088,415 A | 7/2000 | Gaudet | |
| 6,765,975 B2 | 7/2004 | Dunning et al. | |
| 7,298,807 B2 | 11/2007 | Zerbe et al. | |
| 2004/0062336 A1 | 4/2004 | Kuwata et al. | |
| 2006/0039513 A1* | 2/2006 | Sheen et al. | 375/355 |
| 2006/0203939 A1 | 9/2006 | Chou et al. | |
| 2007/0297548 A1 | 12/2007 | Tsukamoto et al. | |

* cited by examiner

*Primary Examiner* — Khanh C Tran
*Assistant Examiner* — David Huang
(74) *Attorney, Agent, or Firm* — Knobbe Martens Olson & Bear LLP

(57) ABSTRACT

Apparatus and methods detect the presence of an isolated pulse in a communications signal, such as a data signal carrying data for a serializer/deserializer (SerDes). An example of an isolated pulse is a "1" pulse preceded and followed by "0" pulses, or a "0" pulse preceded and followed by a "1" pulse. These isolated pulses can exhibit a narrow pulse width, and under severe jitter conditions, may not align with a baud sample point, which can cause the isolated pulse to be missed, resulting in a data decoding error. By detecting the presence of these isolated pulses and determining the most likely baud period to which they belong, jitter tolerance can be improved for many channel conditions. This can improve jitter tolerance of a SerDes receiver for links that suffer from various sources of Deterministic Jitter (DJ) such as Duty Cycle Distortion (DCD) and Inter-Symbol Interference (ISI).

18 Claims, 7 Drawing Sheets

METHOD AND APPARATUS FOR SERDES JITTER TOLERANCE IMPROVEMENT

BACKGROUND

1. Field of the Invention

The invention generally relates to electronics, and in particular, to non-return-to-zero (NRZ) serializer-deserializer (SerDes) communication devices.

2. Description of the Related Art

In SerDes communication, one of the primary design considerations is the tolerance of the receiver to jitter. This jitter can take many forms: random with Gaussian distribution, bounded uncorrelated, bounded correlated, sinusoidal, duty cycle distortion, etc.

A receiver that is more tolerant to jitter has a great advantage as the SerDes link can then operate over greater distances and/or over poorer channels. Numerous techniques exist for improving SerDes receiver jitter tolerance in the presence of signal impairments. These techniques range from very sophisticated techniques that provide substantial jitter tolerance improvement, but at the cost of high receiver complexity, to simple techniques that provide only minimal jitter tolerance improvement.

The use of signal equalization and/or pre-conditioning is a common approach. Equalization can be performed in the analog domain, or in the digital domain following sampling of the received signal with an Analog-to-Digital Converter (ADC). Equalization can be linear or non-linear in nature. Using equalization, data correlated impairments are reduced, providing more tolerance to jitter. Examples can be found in, for example, U.S. Pat. Nos. 6,088,415; 5,452,333; and 6,765,975.

For SerDes signals that are distorted primarily by Duty Cycle Distortion, a common approach is to offset the decision level of the slicer. Examples using this basic technique can be found in, for example, U.S. Pat. No. 4,736,391, and U.S. Patent Application Publication Nos. 2007/0297548 and 2006/0203939.

For SerDes signals that are distorted primarily by Duty Cycle Distortion, another common approach is to adjust the average timing phase based on the estimated signal duty cycle. Examples using this basic technique can be found in U.S. Pat. No. 5,761,254 and in U.S. Patent Application Publication No. 2004/0062336.

Yet another technique for accommodating Duty Cycle Distortion is to adjust the duty cycle of the local clock based on the duty cycle of the incoming data as disclosed in, for example: U.S. Pat. No. 7,298,807.

When attempting to operate over greater distances and/or poorer channels, Inter-Symbol Interference (ISI) often becomes a dominating factor in jitter tolerance. In the context of SerDes, ISI is often referred to as Data Dependent Jitter (DDJ). Most often, ISI is the result of a low-pass frequency response of the transmission channel medium. That is, the low frequency portion of the transmitted waveform is more easily passed, while the higher frequency portion of the transmitted waveform tends to be attenuated in amplitude. To those skilled in the art, the impact on the transmitted "eye" of the signal is well known. Typically, horizontal and vertical opening of the "eye" becomes smaller with increasing levels of ISI.

FIG. 1 illustrates two different exemplary eye diagrams. Both diagrams show eight different signal path trajectories, corresponding to the eight possible combinations of three sequential binary digits: 000, 001, 010, 011, 100, 101, 110, 111. The first eye diagram (to the left) depicts an ideal case, in which the eye is maximally open in both the vertical and horizontal direction. In this case, there is no ISI and the eight different trajectories are hard to differentiate. The second eye diagram (to the right) depicts the case in which significant ISI has distorted the signal and the eight different signal trajectories are clearly visible. Also, in both eye diagrams, the eye opening is shown by a diamond. Clearly, the eye opening in the ideal case is larger.

In the ideal channel example, the timing of the data decision moment can be offset from ideal by as much as one-half the baud period before a data decision error is made. However, in the case of the ISI channel, the amount of offset from ideal that can be tolerated is less than one-half of a baud period. This reduction results in a reduction of the jitter tolerance.

There several common methods to address the described problem. If the received signal is sampled with a multi-level ADC, then it is possible to apply a digital equalizer to compensate for the ISI, thus opening the effect "eye" of the signal and improving jitter tolerance.

Similarly, it is possible to implement an equalizer in analog circuitry. The analog approach removes the need for a multi-level ADC, but has its own set of complications.

Yet another possible design approach to address the problem is to perform pulse extension. This can be done in either the analog domain or in the digital domain.

FIG. 2 and FIG. 3 illustrate the operation of a conventional asynchronous SerDes receiver. Numerous variations exist for this basic structure; however, this basic structure will serve to illustrate the problem at hand.

In FIG. 2, the receiver samples the received NRZ waveform multiple times per baud period using a 1-bit ADC (that is, a "slicer") 202. The sampling rate provided by the sample clock is approximately equal to an integer multiple of the baud rate. N consecutive samples are collected and output by the SIPO (Serial In, Parallel Out) block 204 at a correspondingly lower rate. A lower rate clock signal is also provided by a divide by N block 210, which divides the sample clock by N. From each group of samples, the Sample Selection block 206 selects and outputs the 1-bit sample corresponding to the center of the baud period and the sample offset from this sample by ½ of the baud period. The first 1-bit sample is the recovered NRZ data bit. The second 1-bit sample helps with timing recovery, for example, when using the Gardner algorithm. The Timing Control block 208, which implements the Gardner algorithm or other suitable timing recovery technique, is responsible for determining the correct timing and communicating to the Sample Selection block 206 which samples to select. Due to the asynchronous nature of the receiver, it is possible that some sample groups do not contain a data sample while other sample groups contain two data samples. These are issues familiar to those knowledgeable in the art and do not need to be discussed in detail.

FIG. 3 illustrates the signal sampling process and the selection of the Data sample and the additional sample for timing control purposes. In this example, samples of the received waveform are taken at a frequency that is 8 times the approximate baud rate. That is, there are approximately 8 samples per baud. When the received waveform is greater than or equal to the slicer threshold, a "1" is output by the slicer 202 (FIG. 2). When the received waveform is less than the slicer threshold, a "0" is output by the slicer 202. Eight consecutive samples are grouped by the SIPO block 204. Of these eight samples, one sample is identified to be the timing sample 220 (FIG. 2) and one sample is identified to be the data sample 222 (FIG. 2). In the described asynchronous receiver, the selection of the data sample 222 is very simple and is sensitive to the problem with isolated pulses described earlier.

SUMMARY OF THE DISCLOSURE

The invention described herein improves the recovery of the data by exploiting the additional signal samples surrounding the Data Sample. Disclosed techniques improve the jitter tolerance of a SerDes receiver for links that suffer from various sources of Deterministic Jitter (DJ), including Duty Cycle Distortion (DCD), and Inter-Symbol Interference (ISI).

The improvement in jitter tolerance is achieved by detecting the presence of isolated pulses (for example, a "1" pulse preceded and followed by "0" pulses, or a "0" pulse preceded and followed by a "1" pulse). Very often, these isolated pulses have a narrow pulse width and, under severe jitter conditions, the isolated pulse may not align with the baud sample point, thus the pulse is missed and a data decoding error occurs. By detecting the presence of these isolated pulses and determining the most likely baud period to which they belong, jitter tolerance can be improved for many channel conditions.

One advantage of the technique is that implementation does not require complex equalization of the received signal and is very simple to implement.

The technique described herein improves the jitter tolerance performance of an NRZ SerDes receiver by improving the detection of isolated pulses wherein the isolated pulses have reduced pulse width due to channel Inter-Symbol Interference (ISI), Duty Cycle Distortion (DCD), or other impairment causing the width of the received isolated pulse to be less than one baud period. For the purpose of this disclosure, an isolated pulse is defined as the received waveform occurring when a single bit of a given polarity is preceded and followed by one or more bits of opposite polarity. Examples of such bit patterns containing isolated pulses are: 010, 101, 00100, 1101011, etc. Note that the pattern 001100 does not contain an isolated pulse as defined herein.

While multiple samples per baud period of the received signal are used, each sample needs only to be a 1-bit sample as provided by a simple slicer. In one embodiment implemented within an asynchronous receiver wherein timing recovery and data recovery are performed in the digital domain, these requirements are satisfied. The disclosed technique provides a simple and easy to implement upgrade of the basic receiver.

Within this document, the disclosed technique is referred to as the Isolated Pulse Detector (IPD). Jitter tolerance is always a critical concern for SerDes devices. The Isolated Pulse Detector is a simple to implement technique that can provide a significant improvement in jitter tolerance with a minimal amount of digital circuitry. The simplicity of the technique means that the additional circuit area and power consumption are kept relatively small while providing significant improvement in jitter tolerance in many SerDes applications.

BRIEF DESCRIPTION OF THE DRAWINGS

These drawings and the associated description herein are provided to illustrate specific embodiments of the invention and are not intended to be limiting.

DETAILED DESCRIPTION OF EMBODIMENTS

Although particular embodiments are described herein, other embodiments, including embodiments that do not provide all of the benefits and features set forth herein, will be apparent to those of ordinary skill in the art.

Figure 1:
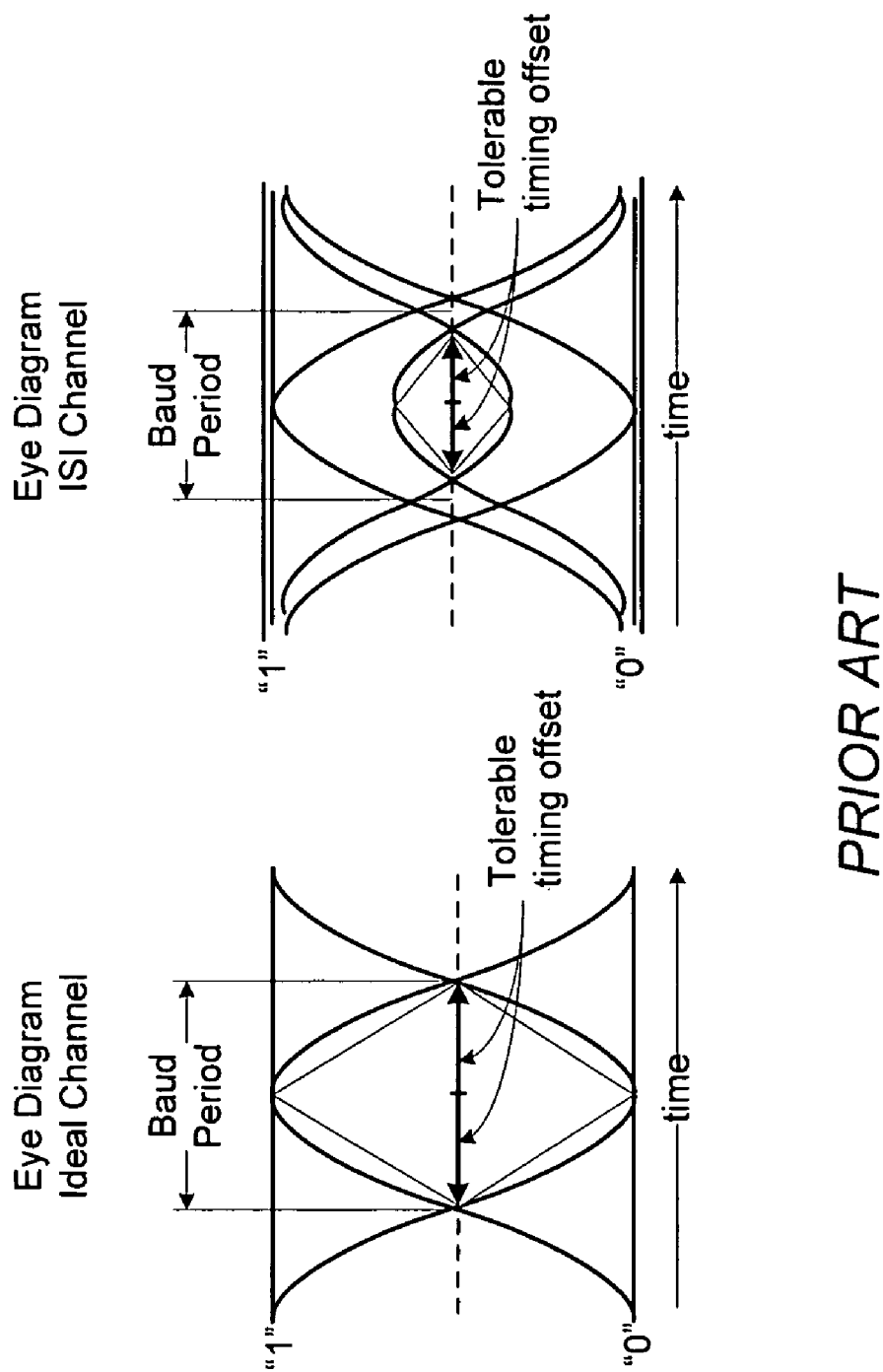
FIG. 1 illustrates two different exemplary eye diagrams.
Figure 2:
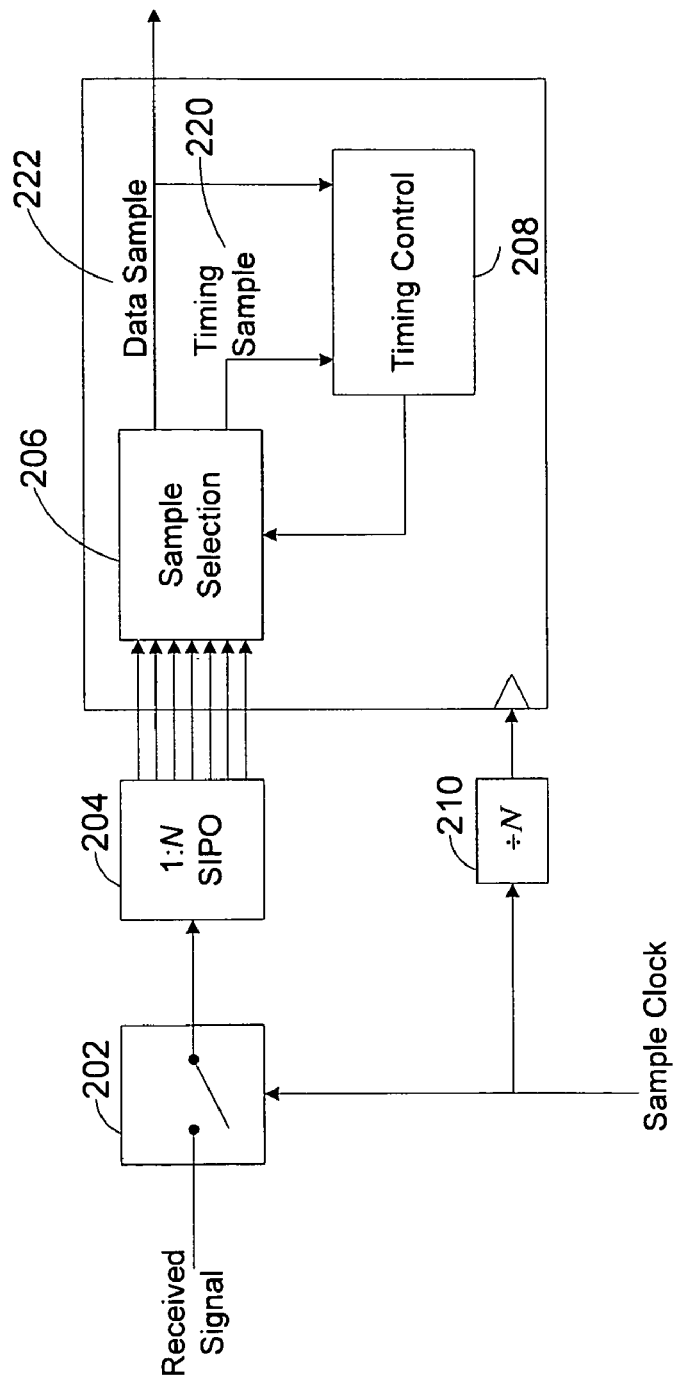
FIG. 2 illustrates a conventional asynchronous SerDes receiver.
Figure 3:
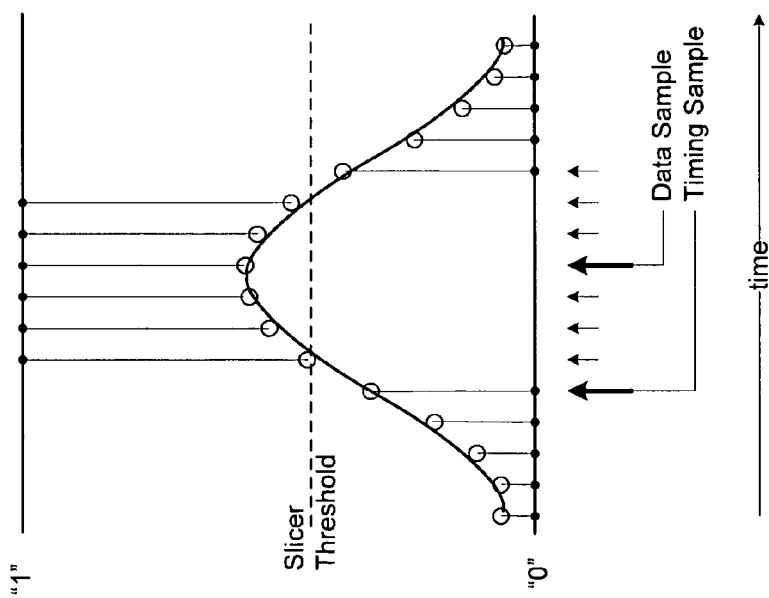
FIG. 3 illustrates the operation of a conventional asynchronous SerDes receiver.
Figure 4:
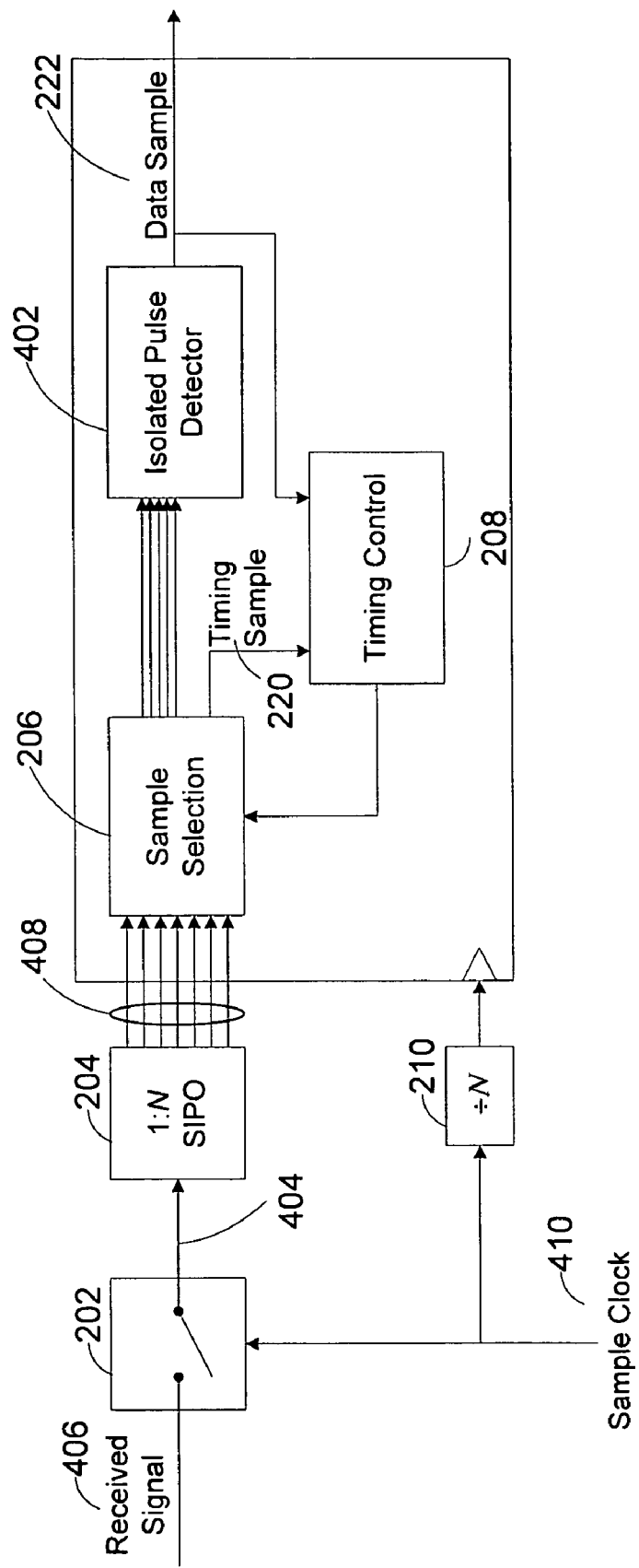
FIG. 4 illustrates an asynchronous SerDes receiver according to an embodiment of the invention.

FIG. 4 illustrates the receiver of FIG. 2 as modified to incorporate an Isolated Pulse Detector 402. The slicer 202 both samples and slices the received signal 406. In the figure, samples 404 of the received signal 406 are collected into groups of N signal samples 408 using the 1:N SIPO block 204. Typically, the parameter N defines the approximate number of samples made per baud interval. During asynchronous operation, typically one data sample 222 is selected per N signal samples 408, but occasionally, a data sample 222 will not be selected from a group of N signal samples 408, and occasionally, two data samples 222 will be selected from a group of N signal samples 408, depending on the asynchronous relationship between the local sample clock 410 and the baud rate of the received signal 406.

Figure 5:
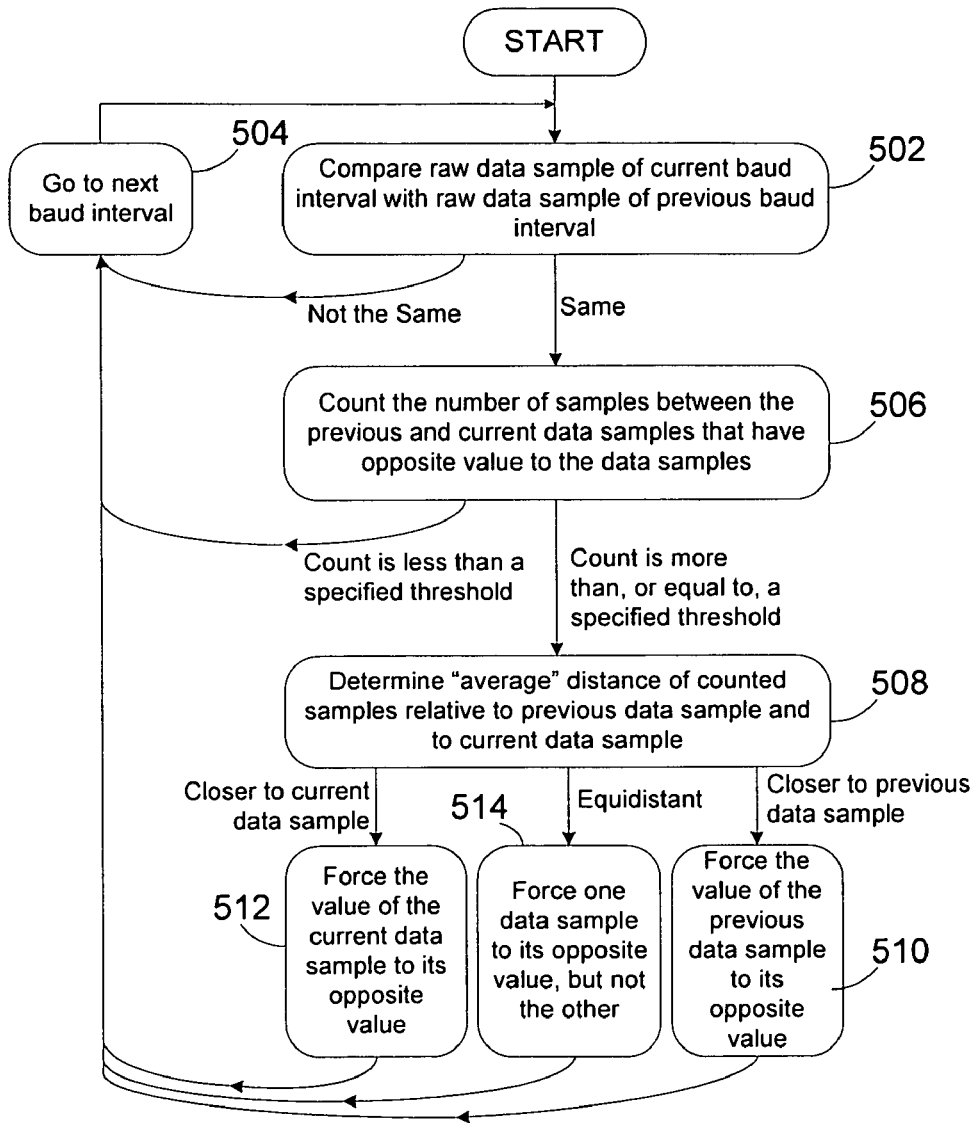
FIG. 5 is a flowchart that generally illustrates a process that detects an isolated pulse and adjusts the value of a data sample in response to the detection.

The operation of one embodiment of the Isolated Pulse Detector 402 is characterized by the logic flowchart shown in FIG. 5. As defined herein, an Isolated Pulse occurs when two consecutive data samples 222 have the same value and there exist at least a threshold number of samples 404 between the samples selected as the two data samples 222 that have opposite value to the two data samples 221. The value of this threshold can be as low as 1. When the threshold is set to 1, the IPD 402 will be able to detect very narrow pulses, at the expense of being more susceptible to noise. In the presence of noise, there is a finite probability that a single sample will have opposite value even when an isolated pulse is not present. Using larger values for the threshold will typically reduce sensitivity to noise, but will typically also make it more difficult to detect very narrow pulses.

FIG. 5 is a flowchart that generally illustrates a process for detection of an isolated pulse. It will be appreciated by the skilled practitioner that the illustrated process can be modified in a variety of ways. For example, in another embodiment, various portions of the illustrated process can be combined, can be rearranged in an alternate sequence, can be removed, or the like. At the start of the process, it is assumed that sample data has already been collected and that, preliminarily, values for "raw" data samples have been identified for the current baud interval and the previous baud interval. Raw data samples correspond to the previous data sample 604 (FIG. 6) and to the current data sample 606 (FIG. 6) before possible correction by disclosed techniques.

The process starts at a decision block 502 to determine whether the current raw data sample of the current baud interval has the same value as the previous raw data sample of the previous baud interval. If the raw data samples do not have the same raw values, the process proceeds to return 504 to the start of the process to analyze data for the next baud interval, and no modification of the raw data samples occurs. In a real-time system, the process may wait for additional data to be collected. In a system with stored data, the next set of data may be retrieved.

If the raw data samples for the baud intervals match in value, the process proceeds from the decision block 502 to a decision block 506 to determine if an isolated pulse exists between the raw data samples. In the illustrated embodiment, the process counts the number of samples between the data samples that have the opposite value to the value of the data samples, and then compares the count to a threshold. The value for the threshold can be one or more. An appropriate threshold value to use will be readily determined by one of ordinary skill in the art. If the count is less than the threshold, the process proceeds to return 504 to the start of the process to analyze data for the next baud interval, and no modification of the raw data samples occurs. If the count is greater than or equal to the threshold, the process proceeds from the decision block 506 to the decision block 508.

Figure 6:
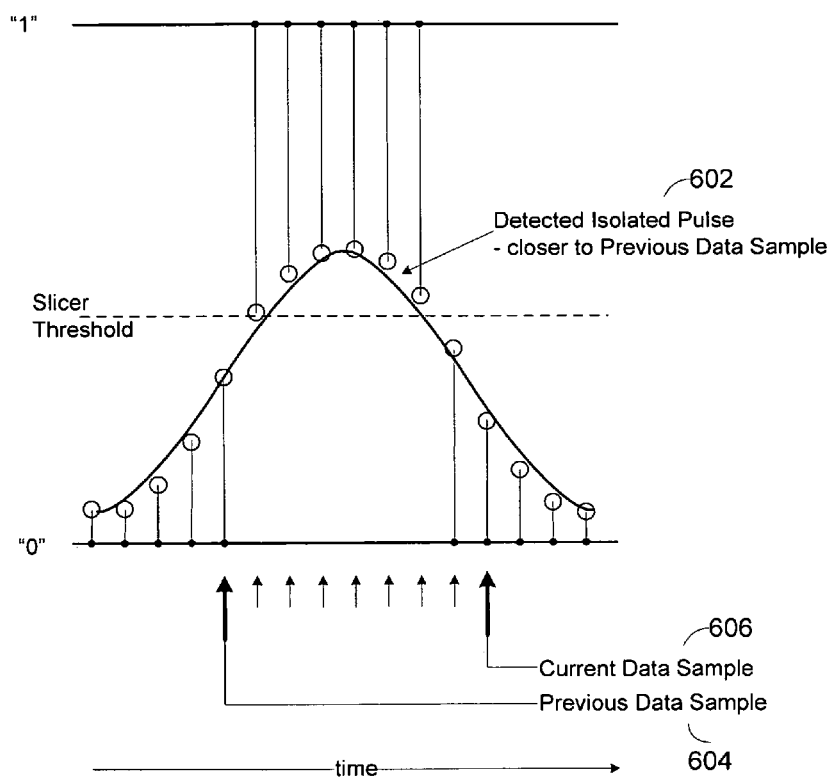
FIG. 6 illustrates the operation of one embodiment of the SerDes receiver.

In the decision block 508, the process determines whether or not the isolated pulse is closer to the current data sample 606 (FIG. 6) or to the previous data sample 604 (FIG. 6). For example, the process can determine an average distance for the isolated pulse from the samples of the current data sample 606 and the previous data sample 604. Other techniques, such as a count of the space, if any, between the isolated pulse and the previous data sample 604 and between the isolated pulse and the current data sample 606, can be used.

If the isolated pulse is closer to the previous data sample 604, then the value of the previous data sample 604 is changed 510 and the value of the current data sample 606 is left unchanged. On the other hand, if the isolated pulse is closer to the current data sample 606, then the value of the current data sample 606 is changed 512 and the value of the previous data sample is left unchanged.

If the isolated pulse is equidistant between the data samples 604, 606, the process can arbitrarily change the value of one and not the other. In one embodiment, the process changes 514 the value of the previous data sample 604 when the isolated pulse has a "0" value and changes the value of the current data sample 606 when the isolated pulse has a "1" value. Other choices can apply to the equidistant case.

The process then returns 504 from the states 510, 512, 514 to the start of the process to analyze data for the next baud interval.

FIG. 6 illustrates an example of the detection of an isolated pulse. In the example, an isolated pulse 602 is present, but due to timing error, both the previous data sample 604 and the current data sample 606 have a value of "0". Between these two samples 604, 606, there are a total of 6 samples that have a value of "1". If the count of 6 exceeds a defined threshold, then an Isolated Pulse 602 is deemed to have been detected. Further examination of the opposite-valued samples 602 reveals that they 602 are closer to the previous data sample 604 than they 602 are to the current data sample 606. Therefore, the slicer-determined value of the previous data sample 604 is over-written with a "1". Thus, an isolated pulse is detected, despite the timing error.

Figure 7:
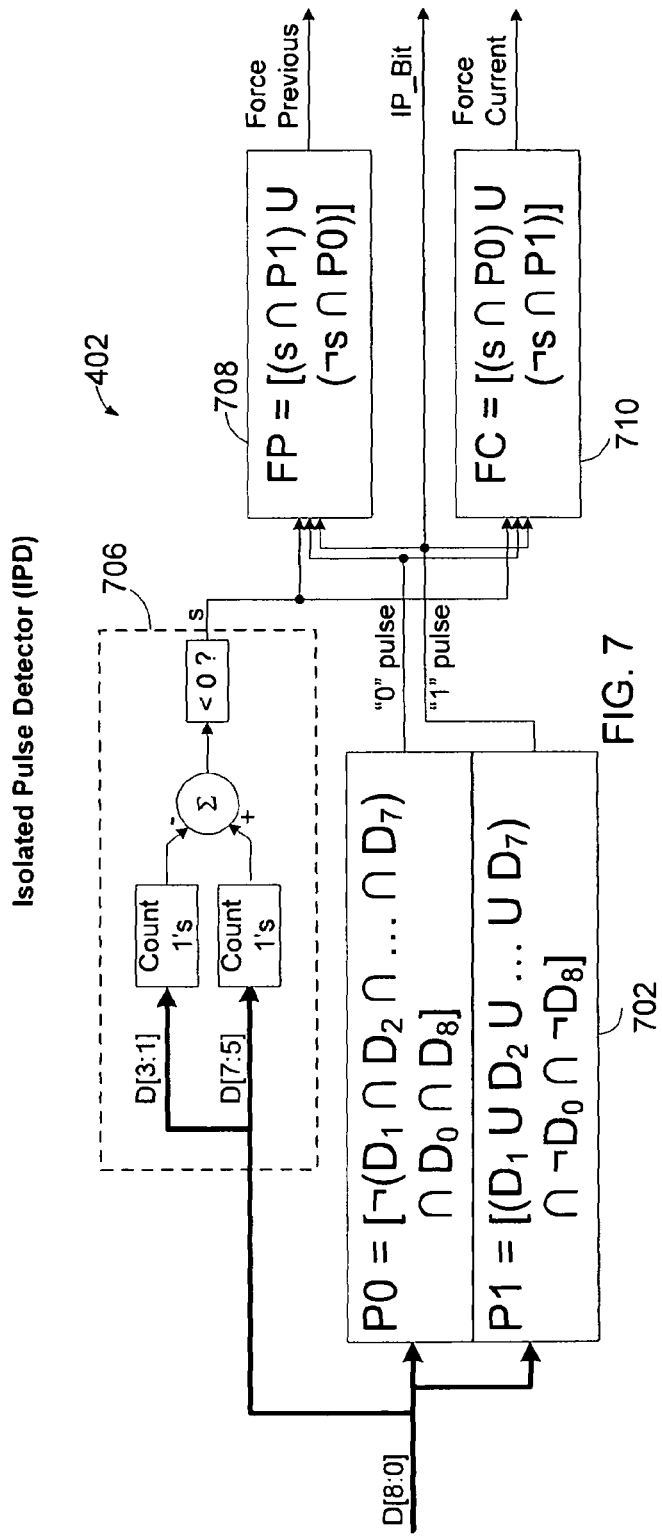
FIG. 7 illustrates an embodiment of an Isolated Pulse Detector.

FIG. 7 illustrates a detailed implementation of an isolated pulse detector (IPD) 402, which is consistent with an embodiment of the logic flowchart described earlier in connection with FIG. 5 and uses a threshold value of 1. In FIG. 7, the IPD 402 is provided with blocks of 9 samples D[8:0]. Sample D0 is the baud aligned raw sample of the previous baud, also known as the previous data sample 604 (FIG. 6). Sample D8 is the baud aligned raw sample of the current baud or current data sample 606 (FIG. 6), and D1 to D7 are the 7 raw samples between the two baud aligned samples D0 604, D8 606. The illustrated system has 8 samples per baud, but can be readily modified by one of ordinary skill in the art to support other sampling rates. The sample selection block 206 (FIG. 4) provides the sample data to the IPD 402. The illustrated embodiment uses a threshold value of 1 for detection of an isolated pulse.

In FIG. 7, "∪" indicates a logical OR, "∩" indicates a logical AND, and "¯" indicates logical inversion. The presence of an isolated pulse is detected using Boolean logic 702 as expressed in equations P0 and P1. Equation P0 is true when there is a false anywhere between D1 and D7, inclusive, and both D0 and D8 are true, so that Equation P0 detects an isolated "low" pulse. Equation P1 is true when there is a true anywhere between D1 and D7, inclusive, and both D0 and D8 are false, so that Equation P1 detects an isolated "high" pulse.

The output s of a count circuit 706 is true when the number of ones in data bits D1 to D3 is higher than the number of ones in data bits D5 to D7 and is false otherwise, and is used to determine whether the detected pulse should be assigned to the previous or current baud interval. The output "IP_Bit" is the output of Equation P1 and is the actual value of the detected isolated pulse, when such a pulse is detected (Equation P1 or Equation P0 being true). Boolean logic 708, 710 generate outputs FP and FC. The output FP "Force Previous" (Equation FP) and the output "Force Current" (Equation FC) indicate to which baud symbol the value of the isolated pulse is being assigned. The following Boolean Logic Equations 1-4 for P0, P1, FP, and FC, respectively, are applicable for the case of a threshold value of 1.

$$P0 = [\overline{(D1 \cap D2 \cap \ldots \cap D7)} \cap D0 \cap D8] \quad \text{(Eq. 1)}$$

$$P1 = [(D1 \cup D2 \cup \ldots \cup D7) \cap \overline{D0} \cap \overline{D8}] \quad \text{(Eq. 2)}$$

$$FP = [(s \cap P1) \cup (\overline{s} \cap P0)] \quad \text{(Eq. 3)}$$

$$FC = [(s \cap P0) \cup (\overline{s} \cap P1)] \quad \text{(Eq. 4)}$$

In the event that a detected isolated pulse is equidistant to both the previous data sample and the current data sample, the illustrated IPD 402 assigns the detected isolated pulse to the previous data sample when the isolated pulse has a "0" value and to the current data sample when the isolated pulse has a "1" value. The foregoing treatment for equal distance is an arbitrary design choice and other actions for the equal distance case are possible.

Earlier, the Isolated Pulse Detector 402 was described in a context in which the raw samples 404 of the received signal 406 were collected into groups of N signal samples 408 in which N is the number of samples taken per baud period. The Isolated Pulse Detector 402 thus operated at a rate approximately equal to the baud rate of the received signal. For very high SerDes data rates, clocking the digital circuitry at the baud rate can become challenging. To enable practical implementations, the architecture of the basic asynchronous receiver and the Isolated Pulse Detector enhancement can be extended to process multiple baud periods of samples simultaneously or in parallel.

For example, consider a system in which the sampling rate is approximately 12 times the baud rate (that is, approximately 12 samples per baud period). The samples can be collected in groups of 96 samples representing 8 baud periods of data. The digital circuitry is expanded to simultaneously extract 8 Data Samples using parallel circuitry. This parallel circuitry will also contain multiple copies of the Isolated Pulse Detector. Although the size of the paralleled digital circuitry will increase, the clock rate for the circuitry will similarly decrease, which typically makes the circuit more practical to implement for high-speed signals.

As described earlier in connection with FIG. 4, the sampling process was represented by a single slicer 202. For practical reasons, it may be advantageous to use multiple slicers, each clocked at a correspondingly lower clock rate and phase shifted in time such that the desired effective sampling rate is achieved. For example, a circuit can use 12 slicers with each slicer clocked at about the baud rate instead of a single slicer being clocked at about 12 times the baud rate.

As described in connection with FIGS. 4 to 6, the illustrated Isolated Pulse Detector 402 uses a threshold value for the number of opposite valued samples that had to be detected before asserting the presence of an isolated pulse. A lower threshold value allows for the detection of narrower pulses, but at the expense of greater sensitivity to false detection in the presence of noise. There are other techniques that can be used to condition the samples to reduce noise sensitivity. For example, the raw data can be conditioned with a simple 3-tap majority filter prior to processing with the above-described circuitry. This filter can effectively remove all occurrences of a single sample noise glitch and greatly improve the tolerance of the Isolated Pulse Detector 402 to noise. An added benefit of the majority filter is the removal of single sample sparkle errors due to imperfections in the implementation of the slicer, particularly if multiple parallel slicers are used. Those skilled in the art will recognize that the following sample stream is possible in such an implementation: 000000000001011111111111, representing two baud periods of data at 12 samples per baud. The simple majority filter will effectively swap the bits of the sparkle error resulting in the desired pattern: 000000000000111111111111. In the context of FIG. 7, the 3-tap majority filter can be implemented in a variety of locations prior to the input of the Isolated Pulse Detector 402, such as at the output of the slicer 202 to filter samples 404, at the output of the SIPO 204, or at the output of the sample selection block 206. In one embodiment, the majority filter is used applied to the samples 404 and a threshold value of 1 is then applied to the filtered samples for the isolated pulse detector 402.

In one embodiment, the digital circuitry described herein is implemented in CMOS using synthesizable register transfer level (RTL) constructs. Instantiation in CMOS provides for a low power implementation. Use of synthesizable RTL constructs allows for easy re-use and porting of the design to other applications and silicon processes.

Those skilled in the art will recognize that the described circuitry and techniques can be implemented in a variety of technologies including FPGAs, CPLDs, discrete components, etc., including technologies that are not based on CMOS, including CML if extremely high speed operation is desired.

Those skilled in the art will also recognize that the described circuitry and techniques are easily implemented using custom design techniques such as full custom CMOS design and layout instead of synthesizable RTL.

Implementation of the described digital circuitry and techniques within a software based microprocessor or similar device is possible for lower data rate devices, such as phone modems, ISDN modems, DSL modems, cable modems, and the like.

Various embodiments have been described above. Although described with reference to these specific embodiments, the descriptions are intended to be illustrative and are not intended to be limiting. Various modifications and applications may occur to those skilled in the art.

What is claimed is:

1. A method of asynchronously receiving a data signal having embedded therein data symbols, the method comprising:
   oversampling and slicing the received data signal to generate multiple 1-bit raw samples per data symbol;
   identifying a data sample per data symbol from the multiple raw samples; and
   changing the value of one of two consecutive data samples to an opposite value when the two consecutive data samples have the same value and if there are one or more raw samples having an opposite value to that of the two consecutive data samples, wherein the one or more raw samples are interposed between the two consecutive data samples.

2. The method of claim 1, further comprising filtering the raw samples with a majority filter, and using the filtered raw samples in determining whether there are one or more raw samples having an opposite value to that of the two consecutive data samples.

3. The method of claim 1, wherein changing the value further comprises:
   counting the one or more raw samples having the opposite value;
   comparing the count to a threshold value, wherein the threshold value is at least two; and
   changing the value of one of the two consecutive data samples only when the count is greater than or equal to the threshold value.

4. The method of claim 1, wherein changing the value further comprises:
   wherein the two consecutive data samples comprise a first data sample and a second data sample;
   determining which of the first data sample or the second data sample is closer to the one or more raw samples having the opposite value; and
   changing the value of the closer of the first data sample or the second data sample.

5. The method of claim 4, further comprising when the first data sample and the second data sample are equidistant to the one or more data samples having the opposite value, selecting the one of the first data sample or the second data sample to change based on the value of the one or more data samples.

6. The method of claim 1, wherein changing the value further comprises:
   wherein the two consecutive data samples comprise a first data sample and a second data sample;
   counting the one or more raw samples having the opposite value;
   comparing the count to a threshold value, wherein the threshold value is at least two;
   determining which of the first data sample or the second data sample is closer to the one or more raw samples having the opposite value; and
   changing the value of one of the first data sample or the second data sample only when the count is greater than or equal to the threshold value, wherein the one that is changed is closer to the one or more raw samples having the opposite value.

7. The method of claim 6, further comprising selecting which of the first data sample or the second data sample to change based on the value of the one or more data samples when the first data sample and the second data sample are equidistant to the one or more data samples having the opposite value.

8. The method of claim 1, further comprising performing the method in a serializer/deserializer (SerDes).

9. The method of claim 1, wherein changing the value is performed by firmware or software executed by a processor in real time.

10. An apparatus for asynchronously receiving a data signal having embedded therein data symbols, the apparatus comprising:

means for oversampling and slicing the received data signal to generate multiple 1-bit raw samples per data symbol;

means for identifying a data sample per data symbol from the multiple raw samples; and means for changing a value of one of two consecutive data samples to an opposite value when two consecutive data samples have the same value and if there are one or more raw samples having an opposite value to that of the two consecutive data samples, wherein the one or more raw samples are interposed between the two consecutive data samples.

11. An apparatus for asynchronously receiving a data signal having embedded therein data symbols, the apparatus comprising:

a slicer configured to oversample and slice the received data signal to generate multiple 1-bit raw samples per data symbol;

a timing control circuit configured to identify a data sample per data symbol from the multiple raw samples; and an isolated pulse detector configured to change a value of one of two consecutive data samples to an opposite value when two consecutive data samples have the same value and if there are one or more raw samples having an opposite value to that of the two consecutive data samples, wherein the one or more raw samples are interposed between the two consecutive data samples.

12. The apparatus of claim 11, further comprising a majority filter, wherein the majority filter is configured to filter the raw samples, and wherein the isolated pulse detector is configured to analyze the filtered raw samples to determine whether there are one or more raw samples having an opposite value to that of the two consecutive data samples.

13. The apparatus of claim 11, wherein the isolated pulse detector is further configured to:

count the one or more raw samples having the opposite value;

compare the count to a threshold value, wherein the threshold value is at least two; and change the value of one of the two consecutive data samples only when the count is greater than or equal to the threshold value.

14. The apparatus of claim 11, wherein the two consecutive data samples comprise a first data sample and a second data sample, wherein the isolated pulse detector is further configured to:

determine which of the first data sample or the second data sample is closer to the one or more raw samples having the opposite value; and change the value of the closer of the first data sample or the second data sample.

15. The apparatus of claim 14, wherein the isolated pulse detector is further configured to select the one of the first data sample or the second data sample to change based on the value of the one or more data samples when the first data sample and the second data sample are equidistant to the one or more data samples having the opposite value.

16. The apparatus of claim 11, a wherein the two consecutive data samples comprise a first data sample and a second data sample, wherein the isolated pulse detector is further configured to:

count the one or more raw samples having the opposite value;

compare the count to a threshold value, wherein the threshold value is at least two;

determine which of the first data sample or the second data sample is closer to the one or more raw samples having the opposite value; and change the value of one of the first data sample or the second data sample only when the count is greater than or equal to the threshold value, wherein the one that is changed is closer to the one or more raw samples having the opposite value.

17. The apparatus of claim 16, wherein the isolated pulse detector is further configured to select which of the first data sample or the second data sample to change based on the value of the one or more data samples when the first data sample and the second data sample are equidistant to the one or more data samples having the opposite value.

18. The apparatus of claim 11, wherein the apparatus is embodied in a serializer/deserializer (SerDes).

* * * * *